(12) United States Patent
Vinje et al.

(10) Patent No.: US 8,914,270 B2
(45) Date of Patent: Dec. 16, 2014

(54) PRESERVED-TRAVELTIME SMOOTHING METHOD AND DEVICE

(75) Inventors: Vetle Vinje, Oslo (NO); Alexey Stovas, Trondheim (NO)

(73) Assignee: CGGVeritas Services SA, Massy Cedex (FR), .

( * ) Notice: Subject to any disclaimer, the term of this patent is extended or adjusted under 35 U.S.C. 154(b) by 457 days.

(21) Appl. No.: 13/398,049

(22) Filed: Feb. 16, 2012

(65) Prior Publication Data

US 2012/0215501 A1 Aug. 23, 2012

Related U.S. Application Data

(60) Provisional application No. 61/445,180, filed on Feb. 22, 2011.

(51) Int. Cl.
G06G 7/48 (2006.01)
G01V 1/30 (2006.01)

(52) U.S. Cl.
CPC ................................. *G01V 1/303* (2013.01)
USPC ................................. 703/10; 703/2; 703/6

(58) Field of Classification Search
None
See application file for complete search history.

(56) References Cited

U.S. PATENT DOCUMENTS

| 4,853,903 | A | 8/1989 | Linville, Jr. et al. | |
| 5,570,321 | A * | 10/1996 | Bernitsas | 367/38 |
| 8,203,907 | B2 * | 6/2012 | Krebs et al. | 367/73 |

FOREIGN PATENT DOCUMENTS

WO 2010/051332 A1 5/2010

OTHER PUBLICATIONS

Vinje et al., "Estimation of multivalued arrivals in 3D models using wavefront construction," Part I, Geophysical Prospecting, 1996, 44, 819-842.

Hobro et al., "Direct Representation of Complex, High-contrast Velocity Features in Kirchhoff PreSDM Velocity Models," 70th EAGE Conference & Exhibition, Extended Abstracts, Rome, Italy, Jun. 9-12, 2008.

Baina et al., "How to cope with smoothing effect in ray based PSDM?" 68th EAGE Conference and Exhibition, Extended Abstracts, Vienna, Austria, Jun. 12-15, 2006.

Stovas A., "Kinematically equivalent velocity distributions," Geophysics, 73, No. 5, pp. VE369-VE375, Sep.-Oct. 2008.

Tariq Alkhalifah et al., "Velocity analysis for transversely isotropic media," Geophysics, 60, No. 5, pp. 1550-1566, Sep.-Oct. 1995.

Tariq Alkhalifah, "Velocity analysis using non-hyperbolic moveout in transversely isotropic media," Geophysics, 62, No. 6, pp. 1839-1854, Nov.-Dec. 1997.

Tariq Alkhalifah, "Acoustic approximations for processing in transversely isotropic media," Geophysics, 63, No. 2, pp. 623-631, Mar.-Apr. 1998.

GB Search Report in corresponding Great Britain Application No. GB1203006.0 dated Jun. 13, 2012.

\* cited by examiner

*Primary Examiner* — Omar Fernandez Rivas
*Assistant Examiner* — Herng-Der Day
(74) *Attorney, Agent, or Firm* — Patent Portfolio Builders PLLC

(57) ABSTRACT

Device and method for smoothing an original velocity model of a given subsurface such that a travel-time through the given subsurface is preserved. The method includes receiving the original velocity model, wherein the original velocity model has a set of model parameters that determine a given parameterization and the original velocity model has velocity discontinuities at various depths; selecting a sub-set of model parameters of the given parameterization; converting the selected sub-set of model parameters to composite parameters; smoothing with a processor the composite parameters by applying a convolutional filter (g) such that velocity moments are preserved at the velocity discontinuities; and generating a smooth velocity model by converting the smoothed composite parameters into a smoothed sub-set of model parameters.

21 Claims, 11 Drawing Sheets

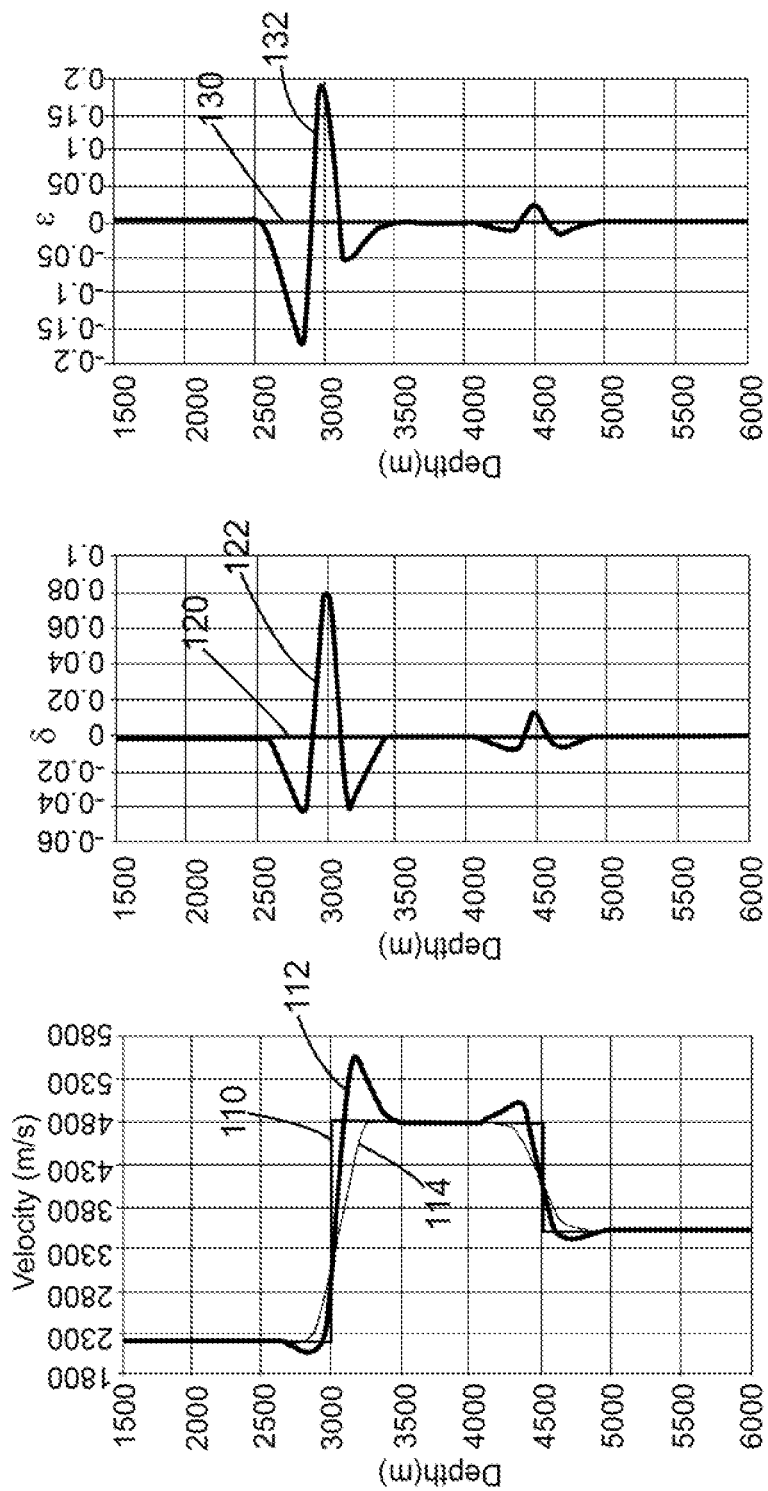

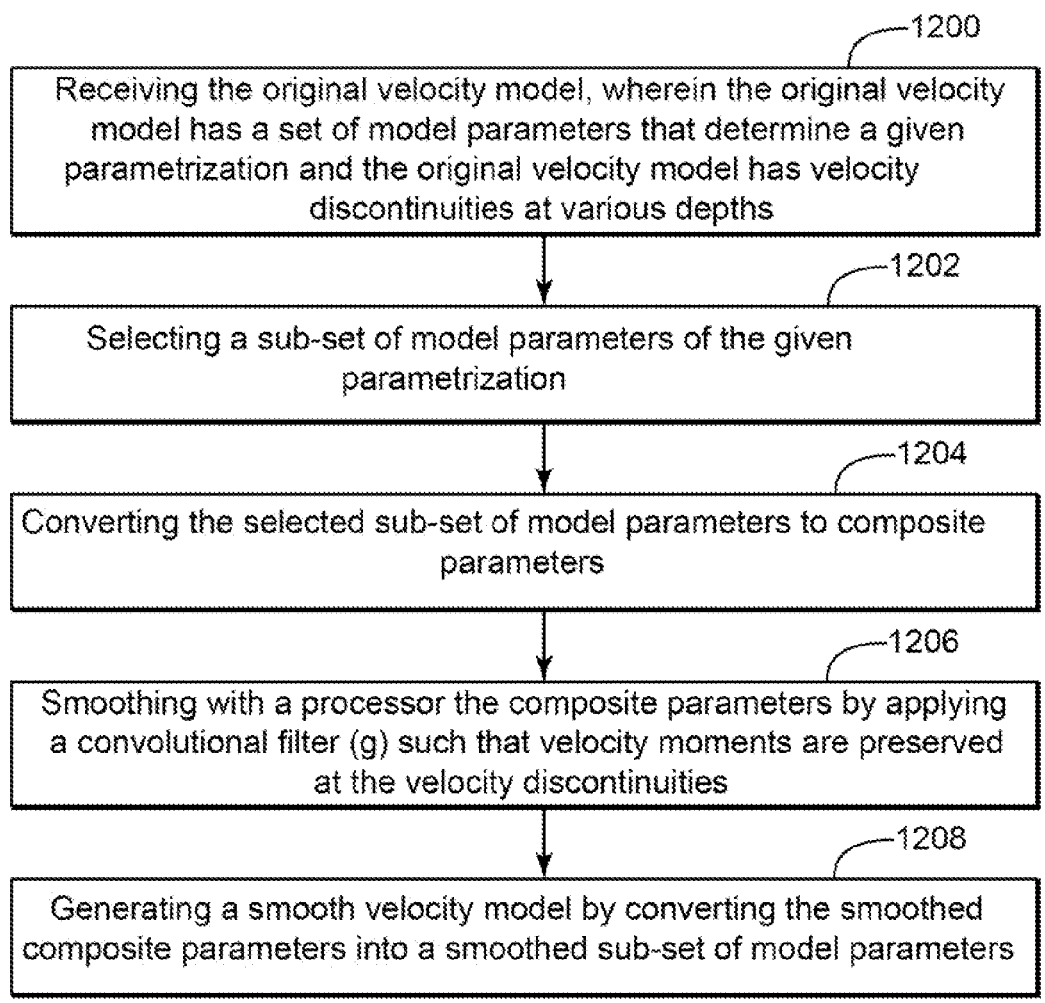

PRESERVED-TRAVELTIME SMOOTHING METHOD AND DEVICE

CROSS-REFERENCE TO RELATED APPLICATIONS

The present application is related to and claims the benefit of priority of U.S. Provisional Application 61/445,180, having the title "Preserved-Traveltime Smoothing," and being authored by Vinje et al., the entire content of which is incorporated herein by reference.

BACKGROUND

1. Technical Field

Embodiments of the subject matter disclosed herein generally relate to methods and systems and, more particularly, to mechanisms and techniques for smoothing a velocity model that has velocity discontinuities.

2. Discussion of the Background

Seismic data acquisition and processing generate a profile (image) of geophysical structures under the seafloor or subsoil. While this profile does not provide an accurate location for oil and gas reservoirs, it suggests, to those trained in the field, the presence or absence of them. Thus, providing a high-resolution image of the structures under the seafloor/subsoil is an ongoing process.

To construct images of the subsoil (or subsurface), geologists or geophysicists conventionally use wave emitters (sources) placed on the surface, for example. For the case of marine seismic surveys, the wave emitters are towed by a vessel at or under the surface of the water. Such emitters emit waves (e.g., acoustic waves) which propagate through the subsoil (and water for the marine seismic) and which are reflected on the surfaces of the various layers thereof (reflectors). Waves reflected to the surface are recorded as a function of time by receivers (which are towed by the same vessel or another vessel for the marine seismic or lay on the ocean bottom). The signals received and recorded by the receivers are known as seismic traces.

Based on the seismic traces, an image of the surveyed subsurface is generated. One ingredient for processing the seismic traces is the depth velocity model. Most ray-based migration and tomography methods require a certain degree of smoothness in the depth velocity models. A drawback of the conventional smoothing is the introduction of errors in the travel-times at the discontinuities of the velocity models. A travel-time is considered to be the time necessary for an emitted wave to travel from the source to a reflector and back to a receiver. These errors are offset-dependent and they cause errors in both depth location of the imaged reflectors and the residual move-out (RMO).

In velocity model-building for pre-stack depth migration (PSDM), the velocity models are commonly built by layer-stripping with discontinuous velocities across the horizons. An example of such a model is shown in FIG. 1, in which various interfaces 10, 12, 14, 16, and 18 are distributed at various depths (on the z axis). A region between two consecutive interfaces, e.g., 12 and 14, has a given velocity v2. The velocity changes rather abruptly from one depth D1 to another depth D2, as illustrated in FIG. 2. These velocity models are usually inserted into the migration algorithms as regularly sampled 3D grids. Existing algorithms, such as ray-tracing (see, e.g., Oerveny V. "Seismic Ray Theory," Cambridge Univ. Press, Cambridge, 2001) used in Kirchhoff migration, or beam migration, have difficulties dealing with the abrupt velocity variations. Thus, a technique for smoothing the velocity models is used. Current practice is to achieve the smoothing by applying a Gaussian or similar bell-shaped filter. For anisotropic models, the smoothing is applied independently on each of the five parameters describing the velocity field, $1/v$, $\delta$, $\epsilon$, $dip_1$, $dip_2$, where v is the wave velocity along the symmetry axis, $\delta$ and $\epsilon$ are the Thomsen parameters, and $dip_1$ and $dip_2$ describe the dip of the plane perpendicular to the symmetry axis.

In conventional imaging processing, the main direction of anisotropy of the subsurface is often assumed to be equal to the structural dip that follows the geology of the subsurface. When referring to transverse isotropy, this case is often referred to as Structural Transverse Isotropy (STI). In this regard, FIG. 3 shows a portion of a subsurface 20 having various layers 22, 24, 26. The tilt axis 28 for a portion 30 of layer 22 is perpendicular (for most cases) to the surface of the portion 30. The tilt axis is picked from a seismic migrated cube usually obtained by depth migration in an isotropic or Vertical Transverse Isotropy (VTI) or STI or Tilted Transverse Isotropy (TTI) model. The picked tilt axis is usually inserted into the velocity model to describe its main symmetry axis. This will affect wave propagation in this velocity model.

One of the disadvantages of the conventional way of smoothing the velocity model is that migrated events are shifted in comparison to the un-smoothed model at the velocity discontinuities. This shift is dependent on the size of the velocity variation, the size of the smoothing operator, and the offset. Thus, the conventional processing algorithms have a smoothing-induced RMO which may create artefacts in the velocity analysis.

Several solutions to this problem have been proposed in the art. One approach proposes adding explicit horizons in the ray-tracing process and using Snell's law in the transmission of rays (see, for example, Vinje et al., "Estimation of multi-valued arrivals in 3D models using wavefront construction," Part I, *Geophysical Prospecting*, 1996, 44, 819-842, or Hobro et al., "Direct Representation of Complex, High-contrast Velocity Features in Kirchhoff PreSDM Velocity Models," 70th EAGE Conference & Exhibition, Extended Abstracts, 2008).

Another approach was proposed by Baina et al., "How to cope with smoothing effect in ray based PSDM?" 68th EAGE Conference and Exhibition, Extended Abstracts, 2006. This approach combines two models, a smoothed one and a non-smoothed one. The authors used a criterion from a Hamiltonian ray formulation leading to preservation of depths and RMO.

To summarize, most ray-based migration and tomography methods require a certain degree of smoothness of the depth velocity model. Because smoothing changes the velocity model, it is generally difficult to preserve the travel-time between all pairs of points in the model. Using conventional smoothing, the travel-time errors are particularly large at the discontinuities of the velocity model. These errors are offset-dependent and they cause errors in both depth and RMO of depth migrated images. Thus, it would be desirable to provide systems and methods that avoid the afore-described problems and drawbacks.

SUMMARY

According to one exemplary embodiment, there is a method for smoothing an original velocity model of a given subsurface such that a travel-time through the given subsurface is preserved. The method includes a step of receiving the original velocity model, wherein the original velocity model has a set of model parameters that determine a given parameterization and the original velocity model has velocity discontinuities at various depths; a step of selecting a sub-set of model parameters of the given parameterization; a step of converting the selected sub-set of model parameters to composite parameters; a step of smoothing with a processor the composite parameters by applying a convolutional filter (g) such that velocity moments are preserved at the velocity discontinuities; and a step of generating a smooth velocity model by converting the smoothed composite parameters into a smoothed sub-set of model parameters.

According to another exemplary embodiment, there is a computing device for smoothing an original velocity model of a given subsurface such that a travel-time through the given subsurface is preserved. The computing device includes an interface configured to receive the original velocity model, wherein the original velocity model has a set of model parameters that determine a given parameterization and the original velocity model has velocity discontinuities at various depths; and a processor connected to the interface. The processor is configured to select a sub-set of model parameters of the given parameterization; convert the selected sub-set of model parameters to composite parameters; smooth the composite parameters by applying a convolutional filter (g) such that velocity moments are preserved at the velocity discontinuities; and generate a smooth velocity model by converting the smoothed composite parameters into a smoothed sub-set of model parameters.

According to yet another exemplary embodiment, there is a computer readable medium including computer executable instructions, wherein the instructions, when executed by a processor, implement a method for smoothing an original velocity model of a given subsurface such that a travel-time through the given subsurface is preserved. The instructions implement the method noted above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 9A-C are graphs illustrating a vertical velocity, $\delta$ and $\epsilon$ profiles for an unsmooth model, a novel model and a model created by conventional smoothing;

FIG. 12 is a flowchart of a method for smoothing a velocity model according to an exemplary embodiment.

DETAILED DESCRIPTION

Figure 1:
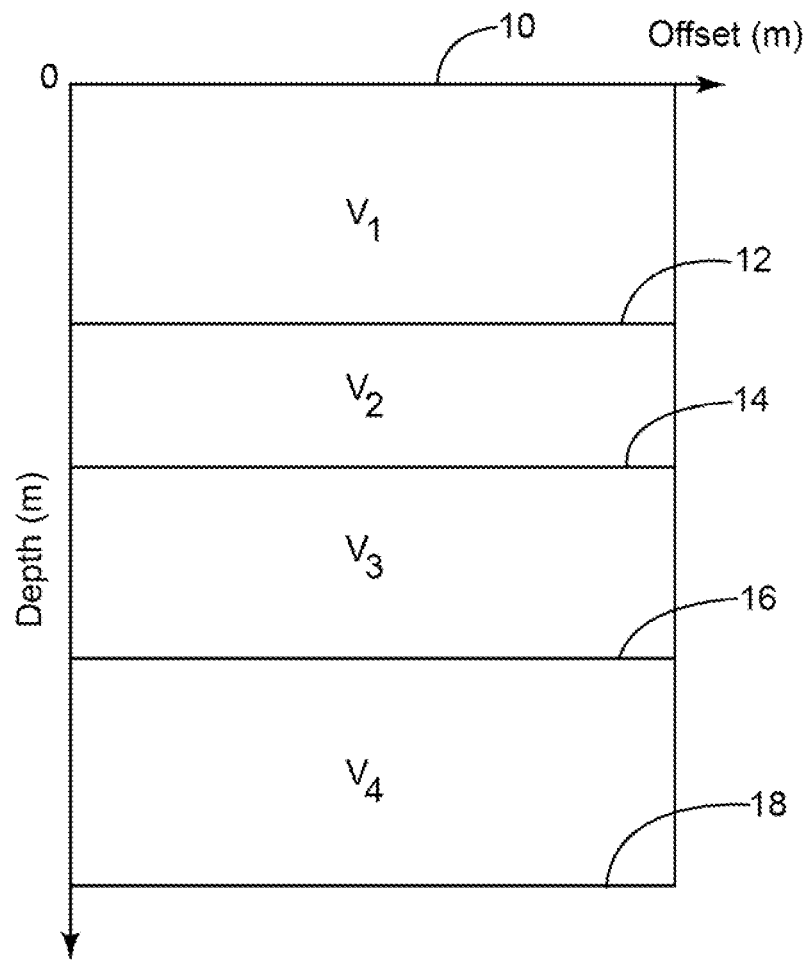
FIG. 1 is a schematic diagram of a layered structure of the earth.
Figure 2:
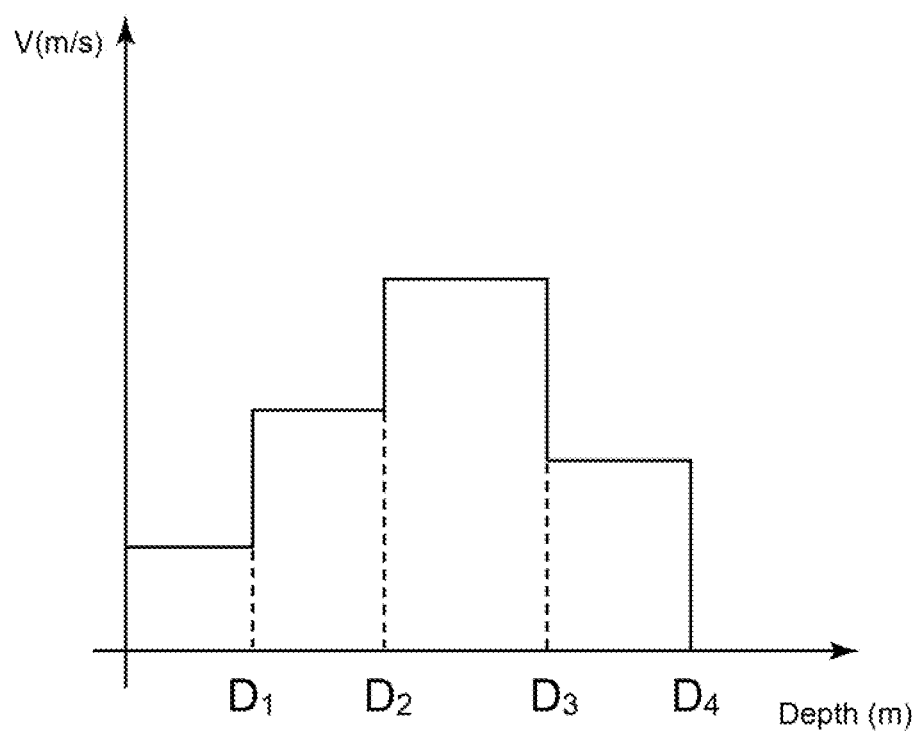
FIG. 2 is a graph illustrating a velocity model.
Figure 3:
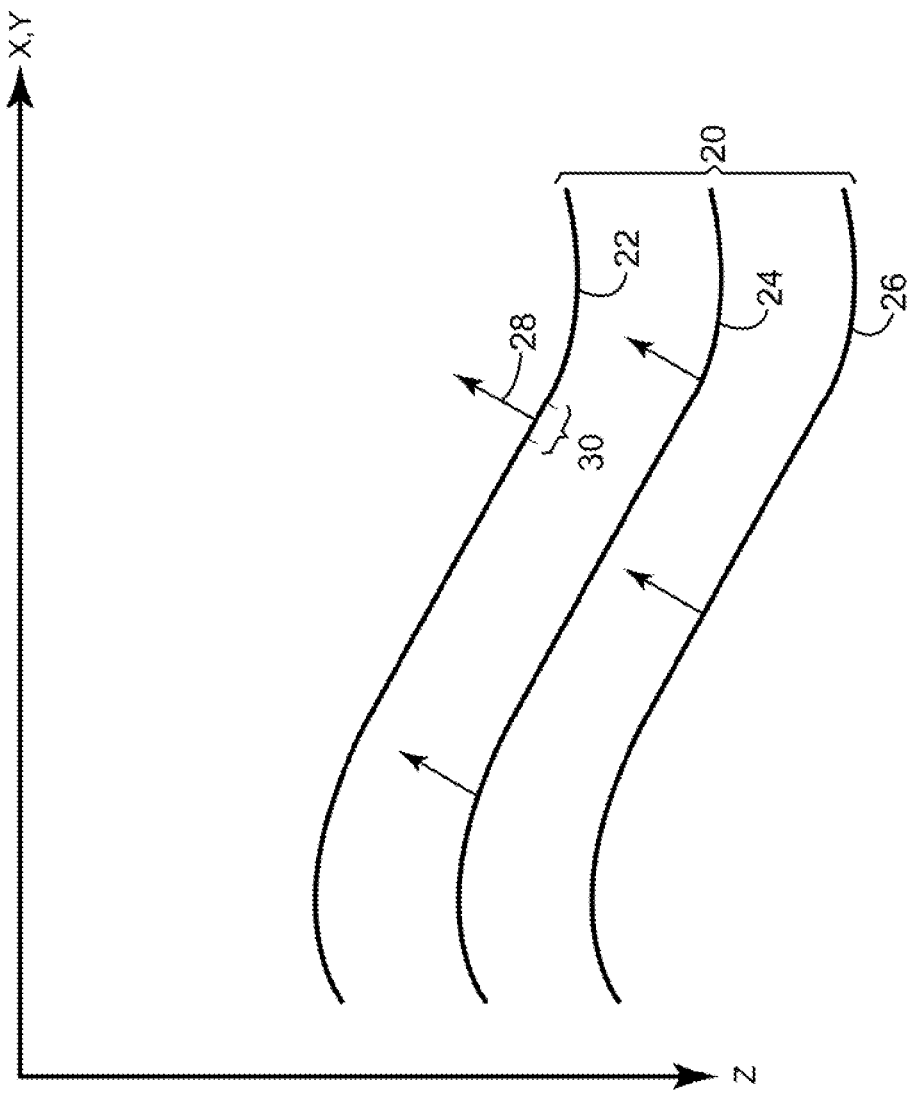
FIG. 3 is a schematic diagram of a portion of a subsurface and a corresponding tilt axis.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a VTI model. However, the embodiments to be discussed next are not limited to the VTI model, but may be applied to other models, e.g., TTI, STI, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a new algorithm, Preserved-Traveltime Smoothing (PTS), is introduced and has an objective of preserving travel-times (and, hence, depths) at velocity discontinuities. Preserving the travel-times is achieved by smoothing composite parameters for an anisotropic model using a specific convolution filter with desired smoothness properties. The new algorithm is valid for isotropic, transversely isotropic with vertical symmetry axis, and structural transverse isotropic models. In one application, the variations of the model parameters perpendicular to the symmetry axis of the anisotropy are assumed to be small.

As the name of the novel algorithm indicates, it is designed to smooth velocity depth values with a minimum change in the travel-times at the velocity discontinuities in the model, for all propagation angles.

In one exemplary embodiment, it is assumed that the symmetry axis in the TTI models is perpendicular to the structural dip in the model, the so-called STI model. PTS needs only one single gridded anisotropic velocity model (as opposed to an existing solution, e.g., Baina et al., "How to cope with smoothing effect in ray based PSDM," 68th EAGE Conference and Exhibition, Extended Abstracts, 2006) and does not need any explicit knowledge of the horizons as in Vinje and Hobro discussed above. The novel method uses two concepts, the kinematically equivalent media, and a new travel-time-preserving filter, which are discussed next. The kinematically equivalent media is discussed in Stovas A., "Kinematically equivalent velocity distributions," *Geophysics*, 73, N10, VE369-375, 2008.

In the description below, it is considered the case of the transverse isotropy with vertical symmetry axis (VTI) in which $dip_1$ and $dip_2$ are both zero and it is shown that this case is travel-time-preserving. Then, remarks are provided that the novel method is valid for the STI case, which is the tilted version of VTI (in which the tilt axis is perpendicular to the reflectors).

In the following exemplary embodiment, the velocity moments are described first and then the composite parameters are smoothed. Finally, the construction and properties of the PTS filter are introduced.

To preserve the travel-times when smoothing the velocity model, the concept of kinematically equivalent velocity models is introduced. This concept relies on the requirement that the first three travel-time parameters (to be discussed next), both in the smoothed and unsmoothed models, are equal. These three travel-time parameters are the vertical two-way travel-time $t_0$, the normal move-out velocity $v_{nmo}$, and the heterogeneity coefficient $S_2$ (see, Alkhalifah and Tsvankin, "Velocity analysis for transversely isotropic media," *Geophysics*, 60, 1550-1566, 1995).

These coefficients are well-known in the field and, thus, a description of them is omitted herein. The three travel-time parameters control the first three coefficients in a Taylor series (see, Hubral and Krey, "Interval velocities from seismic reflection time measurements," SEG, 1980) for a squared two-way travel-time to a reflector at depth z and offset x as follows:

$$t^2(x) = t_0^2 + \frac{x^2}{v_{nmo}^2} + \frac{(1-s_2)x^4}{4 v_{nmo}^4 t_0^2} + . \quad (1)$$

For a homogeneous transversely isotropic model with vertical symmetry axis, the travel-time parameters of equation (1) are defined as:

$$t_0 = \frac{2z}{v}, \quad (2)$$

$$v_{nmo}^2 = v^2(1+2\delta), \text{ and} \quad (3)$$

$$S_2 = 1 + \frac{8(\varepsilon - \delta)}{1 + 2\delta} = 1 + 8\eta, \quad (4)$$

where v is the vertical velocity, $\delta$ and $\epsilon$ are the Thomsen anisotropy parameters, and $\eta$ is the anelliptic anisotropy parameter (see Alkhalifah, T., "Velocity analysis using non-hyperbolic moveout in transversely isotropic media," *Geophysics*, 62, 1839-1854, 1997). The expression for the heterogeneity coefficient $S_2$ in equation (4) is usually referring to an acoustic approximation (see, Alkhalifah T., "Acoustic approximations for processing in transversely isotropic media," *Geophysics*, 63, 623-631, 1998) because the vertical S-wave velocity is not part of this expression.

A more general case is a vertically heterogeneous transversely isotropic model with vertical symmetry axis, in which the travel-time parameters for the depth interval from 0 to z can be computed from velocity moments $m_{-1}$, $m_1$, and $m_3$. A relation between the travel-time parameters $t_0$, v, and $S_2$ and the velocity moments is given by the following equations:

$$t_0 = 2zm_{-1} \quad (5),$$

$$v_{nmo}^2 = \frac{m_1}{m_{-1}}, \text{ and} \quad (6)$$

$$S_2 = \frac{m_3 m_{-1}}{m_1^2}. \quad (7)$$

The velocity moments are given for VTI media as integrals of the velocity parameters from the zero level to a depth of the reflector z, as follows:

$$m_{-1} = \frac{1}{z}\int_0^z \frac{1}{v(\xi)} d\xi, \quad (8)$$

$$m_1 = \frac{1}{z}\int_0^z v(\xi)[1 + 2\delta(\xi)] d\xi, \text{ and} \quad (9)$$

$$m_{13} = \frac{1}{z}\int_0^z v^3(\xi)[1+2\delta(\xi)][1+8\varepsilon(\xi)-6\delta(\xi)] d\xi, \quad (10)$$

where $v(\xi)$ is the vertical velocity profile as a function of the depth $\xi$, and $\delta(\xi)$ and $\epsilon(\xi)$ are the profiles for the anisotropy parameters. Equations (5)-(10) illustrate the combined effect of anisotropy and vertical heterogeneity on travel-time parameters, while equations (2)-(4) model only the anisotropy effect.

According to an exemplary embodiment, the following composite parameters of the new PTS model are selected to be smoothed to preserve (i.e., not change) the velocity moments in equations (8)-(10):

$$n_{-1}(\xi) = \frac{1}{v(\xi)}, \quad (11)$$

$$n_1(\xi) = v(\xi)[1+2\delta(\xi)], \text{ and} \quad (12)$$

$$n_3(\xi) = v^3(\xi)[1+2\delta(\xi)][1+8\varepsilon(\xi)-6\delta(\xi)]. \quad (13)$$

It is noted that when the composite parameters of equations (11)-(13) are inserted into equations (8)-(10), the resulting integrals have the same form $$m_{-1} = \frac{1}{z}\int_0^z n_{-1}(\xi) d\xi,$$

$$m_1 = \frac{1}{z}\int_0^z n_1(\xi) d\xi, \text{ and}$$

$$m_3 = \frac{1}{z}\int_0^z n_3(\xi) d\xi.$$

The composite parameters $n_{-1}$, $n_1$, and $n_3$ are smoothed with the aim that the velocity moments $m_{-1}$, $m_1$ and $m_3$ are preserved at velocity discontinuities. Further, it is noted that the model may have a given parameterization, for example, five parameters v, $\delta$, $\epsilon$, $dip_1$ and $dip_2$. The first three parameters may be smoothed using the novel method presented herein while the remaining parameters may be smoothed using known filters, for example, a Gaussian filter. After the three parameters are converted to composite parameters, the smoothing of the composite parameters may be achieved as shown below in equations (14)-(16), $$m_{-1} = \frac{1}{z}\int_0^z n_{-1}(\xi) d\xi = \frac{1}{z}\int_0^z \tilde{n}_{-1}(\xi) d\xi, \quad (14)$$

$$m_1 = \frac{1}{z}\int_0^z n_1(\xi) d\xi = \frac{1}{z}\int_0^z \tilde{n}_1(\xi) d\xi, \quad (15)$$

$$m_3 = \frac{1}{z}\int_0^z n_3(\xi) d\xi = \frac{1}{z}\int_0^z \tilde{n}_3(\xi) d\xi, \quad (16)$$

where $\tilde{n}_{-1}$, $\tilde{n}_1$, and $\tilde{n}_3$ are the smoothed versions of $n_{-1}$, $n_1$ and $n_3$, respectively.

The smoothing may be achieved with a travel-time-preserving (or more specifically, a moment-preserving) 3D convolution filter, which is described later. The results of the smoothing operation, i.e., $\tilde{n}_{-1}$, $\tilde{n}_1$, and $\tilde{n}_3$, may be converted into the original parameter space (for obtaining the smooth velocity model) using the following inverse equations:

$$\tilde{v}(\xi) = \frac{1}{\tilde{n}_{-1}(\xi)}, \tag{17}$$

$$\tilde{\delta}_\xi = \frac{1}{2}(\tilde{n}_1(\xi)\tilde{n}_{-1}(\xi) - 1), \text{ and} \tag{18}$$

$$\tilde{\varepsilon}(\xi) = \frac{1}{8}\left(\frac{\tilde{n}_3(\xi)\tilde{n}_{-1}^2(\xi)}{\tilde{n}_1(\xi)} + 3\tilde{n}_1(\xi)\tilde{n}_{-1}(\xi) - 4\right). \tag{19}$$

If the anisotropic velocity model is parameterized in $v_0$, $v_{nmo}$ and $\eta$, where $v_0$ is the vertical velocity and $v_{nmo} = v_0 \sqrt{1+2\delta}$ is the normal move-out velocity, the above equations become simpler. This is shown in Appendix A.

It is noted that even if the un-smoothed velocity model is isotropic (i.e., $\varepsilon = \delta = 0$), the PTS algorithm results in smoothing the induced anisotropy. This is required to compensate for the error in travel-time of slant (offset) rays due to the smoothing of the vertical velocity $v(\xi)$.

Next, the novel 3D travel-time-preserving convolutional smoothing filter g is introduced and discussed. This filter acts on the composite parameters $n_{-1}$, $n_1$, and $n_3$ introduced in equations (11)-(13) to preserve the velocity moments $m_{-1}$, $m_1$ and $m_3$. In order to smooth velocity discontinuities independently of their spatial orientation, the filter g is spherically symmetrical, i.e., g(x, y, z)=g(r), where r is given by $r=\sqrt{x^2+y^2+z^2}$, and (x, y, z) is a coordinate system with the origin located in the center of the filter and $r \in [0, L]$, where L is the radius.

In one exemplary embodiment, the filter g(r) may be defined as a combination of two polynomials, i.e., $g(r)=g_1(r)+g_2(r)$, where:

$$g_1(r)=\Sigma_{i=0}^3 a_{1i} r^{2i}, \text{ with } r \in [0,L] \tag{20},$$

and $$g_2(r)=\Sigma_{i=k}^{3+k} a_{2i} r^{2i} \text{ with } r \in [0,L] \tag{21}$$

with eight unknown filter parameters $a_{1i}$, and $a_{2i}$.

The integer constant k in the compensation function (21) is a user-defined parameter which makes it possible to push the compensation further away from the center of the filter by increasing the value of k. The radius of the smoothing function (20) is $L_1$, while the radius of the compensation function is $L_2$. $L_2$ is preferably larger than $L_1$.

The filter g is used to smooth the composite parameters in equations (11)-(13). The equations for the filter parameters are derived in Appendix B using the first of the composite parameters, and the slowness function $$n_{-1}(\xi) = \frac{1}{v(\xi)}.$$

However, due to the symmetry of equations (14)-(16), the results would have been the same if the second or third composite parameters $n_1$ or $n_3$ are used instead of $n_{-1}$. It is noted that the dip parameters $dip_1$ and $dip_2$ may be smoothed using a Gaussian filter or other filter.

Figure 4:
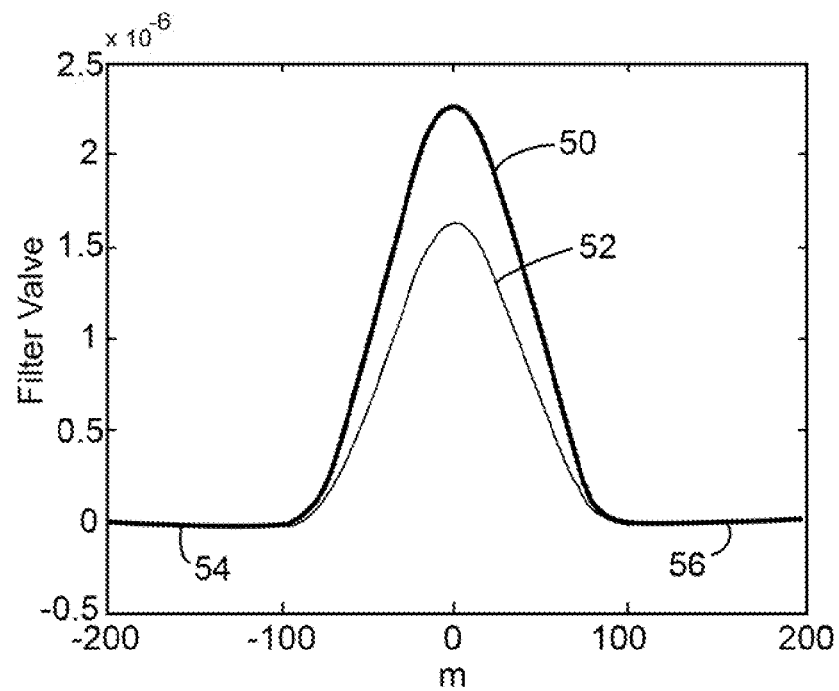
FIG. 4 is a graph of a novel filter and a traditional filter in a spatial domain according to an exemplary embodiment.
Figure 5:
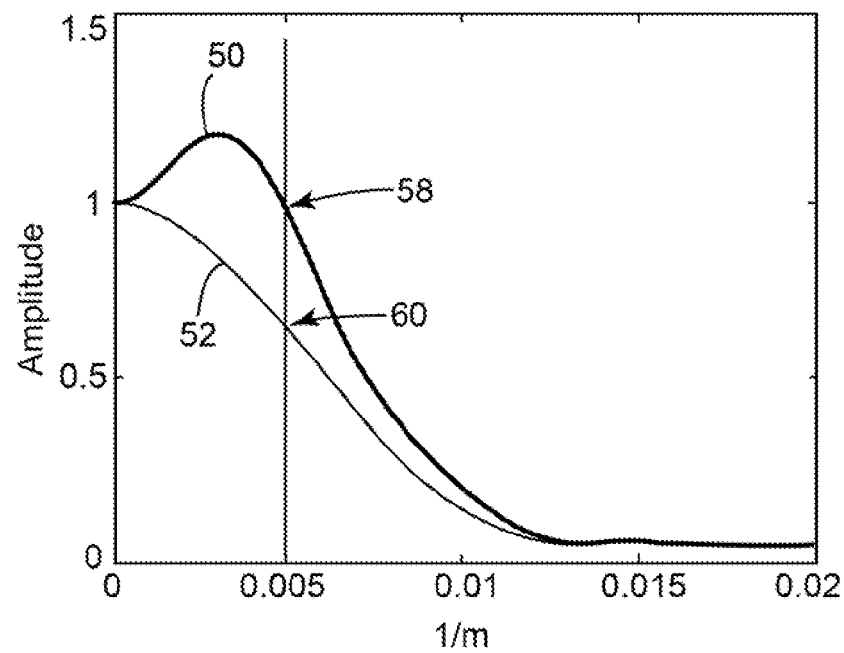
FIG. 5 is a graph of a novel filter and a traditional filter in a wave-number domain according to an exemplary embodiment.

A cross-section 50 of the 3D PTS filter g (fully derived in Appendix B) with parameters $L_1=100$ m, $L_2=200$ m, and k=1 is illustrated in FIG. 4 together with a conventional bell-shaped filter 52. The same is shown in FIG. 5, but in the wave-number domain instead of the spatial domain. The PTS filter g has negative side lobes (see portions 54 and 56, which are below the corresponding regions of curve 52) caused by the compensation function $g_2$, which creates the preservation of travel-times at the velocity discontinuities (e.g., steps). In the wave-number domain, a difference between the novel and conventional filters is that the PTS filter g actually enhances some of the wave-numbers associated with the longer spatial wavelengths of the velocity model, whereas the conventional filter weakens all non-zero wave numbers, as indicated at 58 and 60.

Spatial wavelengths in the unsmooth model corresponding to the smoothing diameter ($2L_1=200$ m in this case) are approximately preserved with the PTS algorithm as seen in FIG. 5 from the wave-number plot (1/200 m=0.005 $m^{-1}$) while it is significantly weakened by the conventional filter. For the higher wave-numbers, the results of the two filters are similar.

Figure 6:
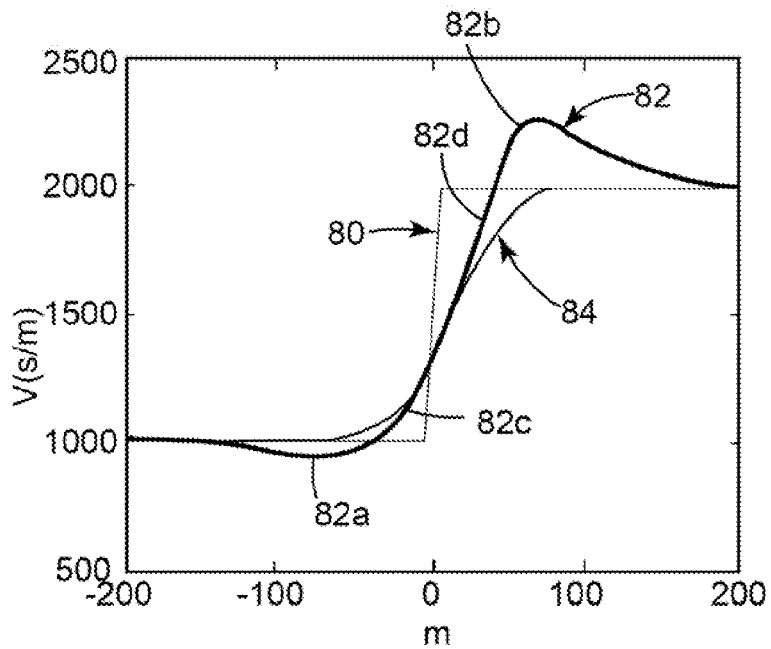
FIG. 6 is a graph illustrating a smooth novel filter and conventional filter according to an exemplary embodiment.
Figure 7:
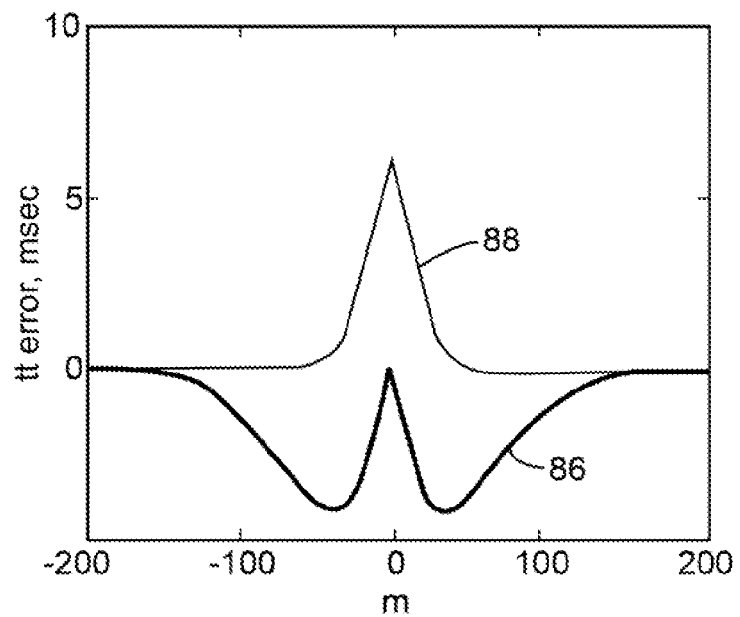
FIG. 7 is a graph of a travel-time error produced by smoothed filters according to an exemplary embodiment.

The novel filter g is now applied to a simple 1D VTI step model in which the velocity is described by a step function. FIG. 6 shows the simple velocity model 80 having a first speed of 1000 m/s between −200 and 0 m and 2000 m/s between 0 and 200 m. The novel PTS filter g 82 and the conventional filter 84 are also plotted in FIG. 6. It is noted that the error in travel-time (error=travel-time in unsmooth model minus travel-time in smooth model) as a function of depth (z) is shown in FIG. 7. It is noted that the PTS travel-time 86 has zero travel-time error at the step (z=0), which is the result of the travel-time preservation property built into the filter. This is achieved by a reduction of the velocity in the PTS model at regions 82a and an increase of the velocity at 82b, i.e., before and after the step for compensating for the smoothing of the velocity closer to the step (regions 82c and d). The maximum travel-time error 88 is larger for the conventional filter, and it is at its maximum at the velocity step (z=0), while the PTS has a larger affected area, but the maximum travel-time error is smaller. This means that if a reflected zero-offset event is zero-phase, the central peak of the migrated reflected event will be located at the correct depth if the smoothing is performed with the PTS model. However, the side lobes of the event will be mis-positioned.

The novel filter g discussed above has been introduced with reference to the VTI case. However, the novel filter g is also valid for the class of TTI models where the axis of symmetry is perpendicular to the structures, the so-called STI models. Consider a zero-offset reflected ray in a STI model. This ray will reflect at a normal angle to the reflectors in the STI model, as it did in the VTI model, and since the smoothed STI model is simply a tilted version of the VTI model, the travel-time error will also be zero in the STI model. A similar consideration is also valid for reflected non-zero offset rays in the STI model.

Figure 8:
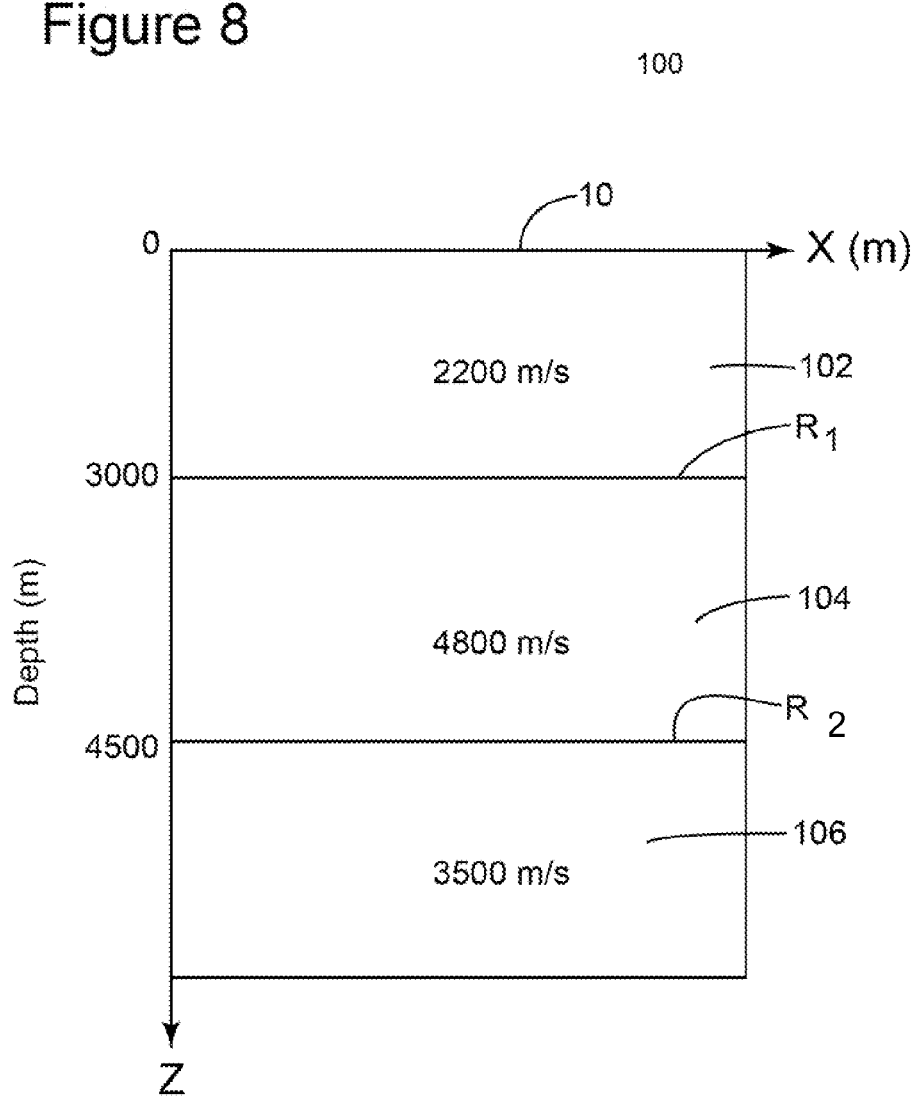
FIG. 8 is a schematic diagram of a synthetic velocity model.

A synthetic VTI model is now discussed, and the novel filter g is applied to this data. The model 100 is illustrated in FIG. 8 and is a 1D three-layer model in which the velocities are 2,200 m/s in an upper layer 102, 4,800 m/s in a middle high-velocity layer 104, and 3,500 m/s in a lower layer 106. Further, FIG. 8 shows a first reflector R1 provided at a depth $z_1=3,000$ m and a second reflector R2 provided at a depth $z_2=4,500$ m.

FIG. 9A shows the velocity-profiles 110, 112 and 114 for the unsmooth model, the PTS smoothing and the conventional smoothing, respectively; FIG. 9B shows the δ-profiles 120 and 122 for the conventional and the PTS smoothing, respectively; and FIG. 9C shows the ε-profiles 130 and 132 for the conventional and the PTS smoothing. It is noted the variations in the δ- and ε-profiles in the PTS model. Both the δ- and ε-profiles are zero in the initial model, but the variations in v transforms into corresponding variations in the PTS values of δ- and ε-profiles as well. This is caused by the smoothing of the composite parameters ($n_{-1}$, $n_1$ and $n_3$) in the PTS algorithm.

Figure 10A:
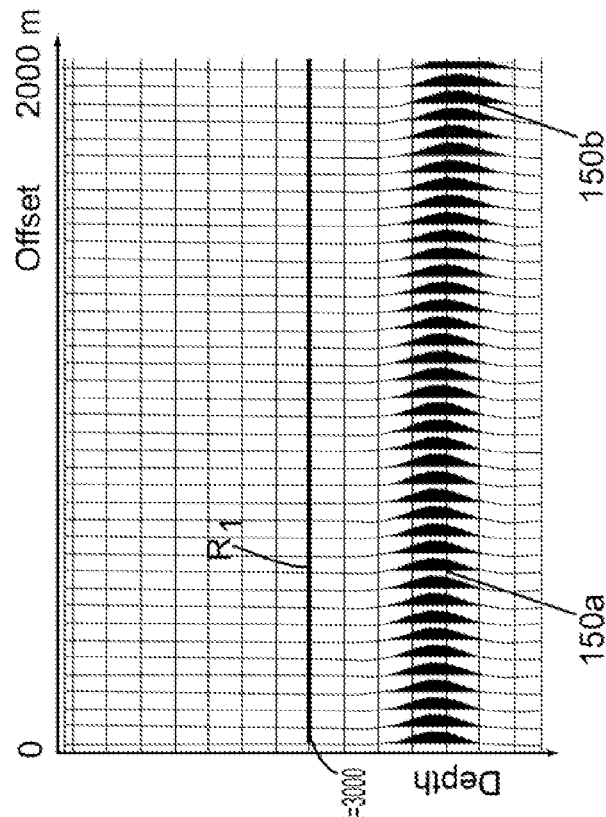
FIGS. 10A-B illustrate Kirchhoff image gathers corresponding to a first depth for the novel model and the conventional model according to an exemplary embodiment.
Figure 10B:
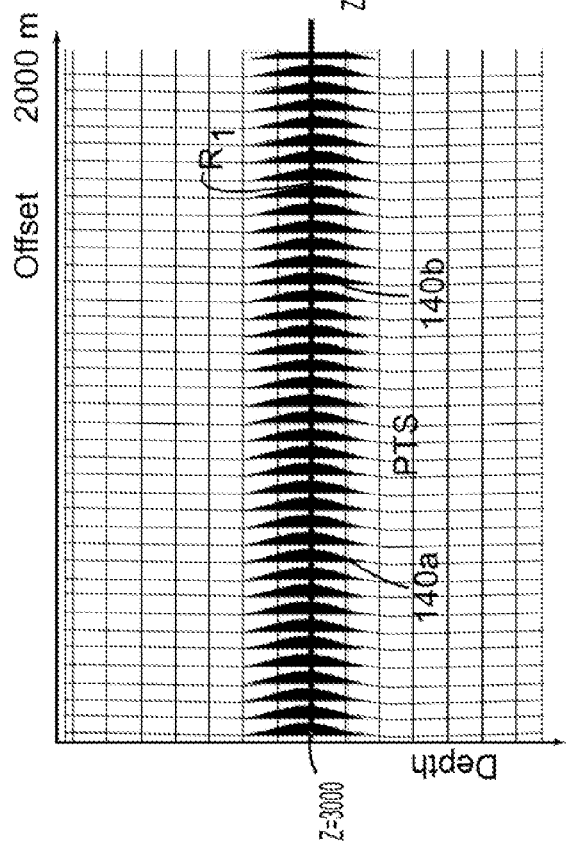

In the unsmoothed model, synthetic seismic data for offsets from 50 m to 2,000 m were generated using a 3D ray-modeling package. The image gathers from Kirchhoff depth migration for the reflector R1 at 3,000 m depth is shown in FIG. 10A for the PTS and in FIG. 10B for the conventional smoothing. A large smoothing diameter of 500 m is used for both models to emphasize the effect of the PTS. It is noted that the PTS preserves the depth for all offsets, while the depth error in the conventional smoothing is between 36 and 43 m. The depth migrated events are located too deep and have smoothing-induced residual move-out. FIG. 10A shows the reflector R1 at a depth z=3,000 m, and all the events 140a and 140b are aligned on the reflector R1, while FIG. 10B shows the events 150a and 150b below the reflector R1 and also distributed at different depths.

Figure 11A:
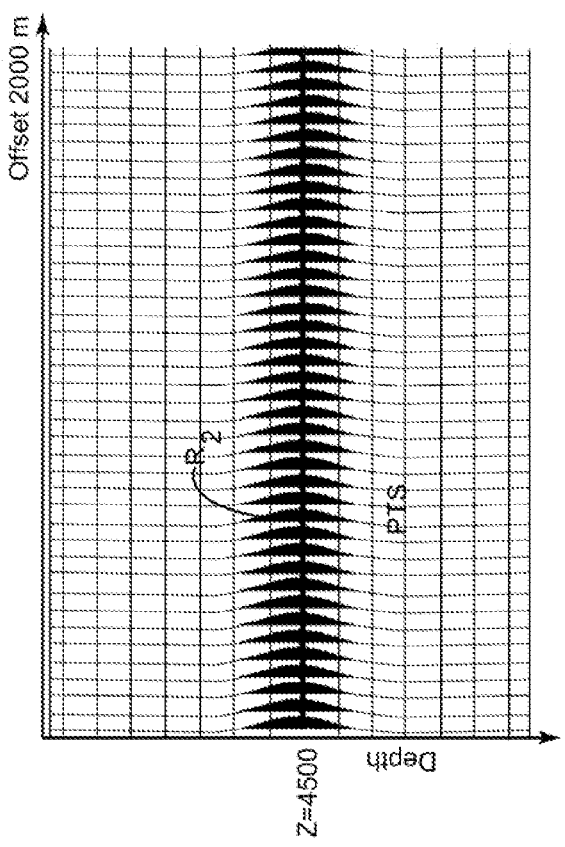
FIGS. 11A-B illustrate Kirchhoff image gathers corresponding to a second depth for the novel model and the conventional model according to an exemplary embodiment.
Figure 11B:
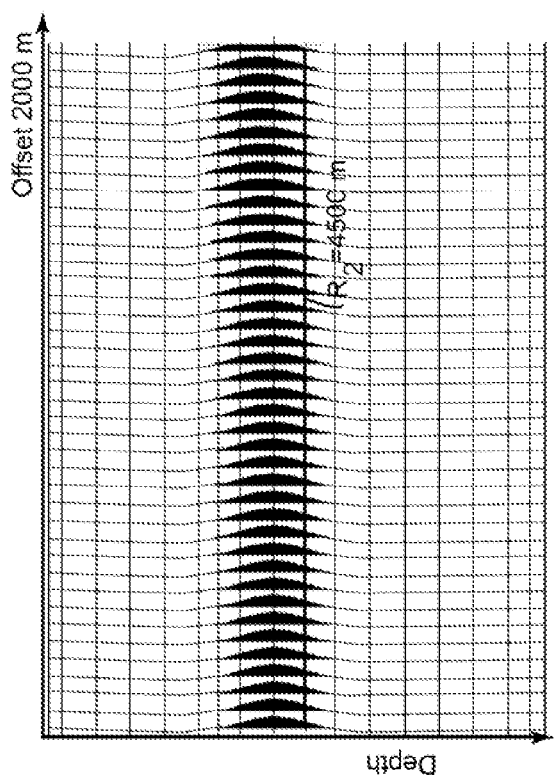

The depth is preserved in the PTS model for all the offsets, not only for the reflector R1 as shown in FIG. 10A, but also for one of the deepest of the reflectors (reflector R2 shown in FIG. 8), as can be seen in FIG. 11A. Due to the velocity inversion here, the conventional smoothing shifts the migrated events upward in FIG. 11B into the high-velocity layer, which is opposite to the case illustrated in FIG. 10B.

It is noted that the smoothing diameter is normally smaller than the 500 m used in this example. Values in the range of 150 to 200 m are common, which gives less effect of PTS. The depth errors using conventional smoothing will be 10-20 m, and the smoothing-induced RMO is still visible and may affect the velocity estimation.

The exemplary embodiments discussed above have considered a VTI case. It was shown that the error in vertical travel-times (i.e., for zero-offset rays) to the reflector is zero, while the error in the offset rays is reduced significantly compared to conventional smoothing. If this VTI system is tilted, a TTI system is obtained. Furthermore, if the reflecting structures are perpendicular to the TTI axis of symmetry, the STI system is obtained. The STI system is a common assumption in velocity model-building for PSDM. In an STI model, the $dip_1$ and $dip_2$ values of the anisotropy are typically taken from the measured dip of the structures in a PSDM image from an earlier model-building iteration.

Consider a zero-offset reflected ray in an STI model. This ray will reflect at a normal angle at the reflectors in the STI model, as it did in the VTI model. Because the smoothed STI model is a tilted version of the VTI model, the travel-time error will also be zero in the STI model. A similar consideration is also valid for reflected non-zero offset rays in the STI model. Thus, the novel PTS model is valid not only for the VTI model, but also for the STI model.

Thus, the novel PTS model presented in one or more of the above embodiments advantageously preserves the travel-times and, hence, the depth of events located at velocity discontinuities recorded at all offsets in various models. The above exemplary embodiments have shown that the PTS model preserves the RMO for zero offsets and approximately preserves the RMO for the larger offsets. The PTS model is suitable for ray-based applications such as Kirchhoff- and beam-migration and ray-based tomography, and it fits within the grid-based velocity representation, which is the dominating industry practice.

One or more of the above-discussed embodiments may be implemented as a method as now discussed with regard to FIG. 12. FIG. 12 is a flowchart that illustrates a method for smoothing an original velocity model of a given subsurface, such that a travel-time through the given subsurface is preserved. The method includes a step 1200 of receiving the original velocity model, wherein the original velocity model has a set of model parameters that determine a given parameterization and the original velocity model has velocity discontinuities at various depths; selecting in step 1202 a sub-set of model parameters (v, δ, ε) of the given parameterization; converting in step 1204 the selected sub-set of model parameters (v, δ, ε) to composite parameters ($n_{-1}$, $n_1$, $n_3$); smoothing in step 1206 with a processor the composite parameters ($n_{-1}$, $n_1$, $n_3$) by applying a convolutional filter (g) such that velocity moments ($m_{-1}$, $m_1$, $m_3$) are preserved at the velocity discontinuities; and generating in step 1208 a smooth velocity model by converting the smoothed composite parameters into a smoothed sub-set of model parameters.

Appendix A: Equations for Alternative Parametrization of Anisotropic Velocity Model If the anisotropic velocity model is parameterized in $v_0$, $v_{nmo}$, $\eta$, where $v_0$ is the vertical velocity, $v_{nmo}=v_0 \cdot \sqrt{1+2\delta}$ is the normal move-out velocity and $\eta$ is the anelliptic anisotropy parameter, equations (8)-(13) become simpler. In this case, the velocity moments in equations (8)-(10) take the form:

$$m_{-1} = \frac{1}{z}\int_0^z \frac{d\xi}{v(\xi)} \quad \text{(A-1)}$$

$$m_1 = \frac{1}{z}\int_0^z \frac{v_{nmo}^2(\xi)d\xi}{v(\xi)}$$

$$m_3 = \frac{1}{z}\int_0^z \frac{v_{nmo}^4(\xi)(1+8\eta(\xi))d\xi}{v(\xi)}.$$

Equations (11)-(13) then become:

$$n_{-1}(\xi) = \frac{1}{v(\xi)} \quad \text{(A-2)}$$

$$n_1(\xi) = \frac{v_{nmo}^2(\xi)}{v(\xi)}$$

$$n_3(\xi) = \frac{v_{nmo}^4(\xi)(1+8\eta(\xi))}{v(\xi)}.$$

To convert the smoothed composite parameters into the model parameters as in equations (17)-(19), the following equations are applied:

$$\tilde{v}(\xi) = \frac{1}{\tilde{n}_{-1}(\xi)} \quad \text{(A-3)}$$

$$\tilde{v}_{nmo}(\xi) = \sqrt{\frac{\tilde{n}_1(\xi)}{\tilde{n}_{-1}(\xi)}}$$

$$\tilde{\eta}(\xi) = \frac{1}{8}\left(\frac{\tilde{n}_3(\xi)\tilde{n}_{-1}(\xi)}{\tilde{n}_1^2(\xi)} - 1\right).$$

Appendix B: PTS Filter Determination

The filter g(r) may be defined as a combination of two polynomials:

$$g(r)=g_1(r)+g_2(r), \quad \text{(A-1)}$$

where $$g_1(r) = \sum_{i=0}^{3} a_{1i} r^{2i} \text{ with } r \in [0, L_1], \quad \text{(B-2)}$$

$$g_2(r) = \sum_{i=k}^{3+k} a_{2i} r^{2i} \text{ with } r \in [0, L_2], \quad \text{(B-3)}$$

with 8 unknown filter parameters $a_{1i}$, $a_{2i}$.

The function $g_1(r)$ is called the "smoothing function," and it represents the central part of the filter and is designed to achieve smoothing across the discontinuities. The radius of the smoothing function is $L_1$.

The function $g_2(r)$ is called the "compensation function" and it creates the adjustments in the velocity field to preserve the travel-time. The radius $L_2$ of $g_2(r)$ is larger than the radius $L_1$ of $g_1(r)$. The integer constant k in the compensation filter (B-3) is a user-defined parameter which makes it possible to push the compensation further away from the center of the filter by increasing the value of k. In the following, a set of eight linear equations is provided that uniquely define the eight unknown coefficients $a_{1i}$ and $a_{2i}$.

The first six equations are given by the boundary conditions of the filter. The first two equations are given by:

$$g_j(r=L_j)=0, j=1,2 \quad \text{(B-4)}$$

that guarantee both filters are zero at their edges. The third and fourth equations are given by:

$$g'_j(r=L_j)=0, j=1,2 \quad \text{(B-5)}$$

that guarantee both filters have zero derivatives at their edges. The fifth and sixth equations are given by:

$$g''_j(r=L_j)=0, j=1,2 \quad \text{(B-6)}$$

that guarantee both filters have zero double derivatives at their edges.

When the filter of equation (B-1) is inserted into the boundary condition of equations (B-4)-(B-6), the following six linear equations are obtained:

$$\sum_{i=0}^{3} a_{1i} L_1^{2i} = 0, \quad \text{(B-7)}$$

$$\sum_{i=k}^{3+k} a_{2i} L_2^{2i} = 0,$$

$$\sum_{i=1}^{3} a_{1i} 2i L_1^{2i-1} = 0,$$

$$\sum_{i=max(k,1)}^{3+k} a_{2i} 2i L_2^{2i-1} = 0,$$

$$\sum_{i=1}^{3} a_{1i} 2i(2i-1) L_1^{2i-2} = 0,$$

$$\sum_{i=max(k,1)}^{3+k} a_{2i} 2i(2i-1) L_2^{2i-2} = 0$$

for the coefficients of the central filter (smoothing function) $g_1$ and the compensation filter (compensation function) $g_2$.

Having found the six equations (B-7), there is still a need to find two more constraints to determine the eight filter parameters. These equations are found by defining a step function in the slowness $n_{-1}$ and calculating the analytic expressions of the travel-times through the smoothed and unsmoothed versions of this model.

The smoothing of $n_{-1}$ is achieved by convolution, resulting in $\tilde{n}_{-1}$ being given by:

$$\tilde{n}_{-1}(x, y, z) = \int_{\xi_1=-L}^{L_2} \int_{\xi_2=-L}^{L_2} \int_{\xi_3=-L}^{L_2} g(\xi_1, \xi_2, \xi_3) \quad \text{(B-8)}$$

$$\tilde{n}_{-1}(x+\xi_1, y+\xi_2, z+\xi_3) d\xi_1 d\xi_2 d\xi_3.$$

Since the filter is spherically symmetrical, it is more convenient to do the smoothing in spherical coordinates (r, θ, φ). In this case, the filtering is given by:

$$\tilde{n}_{-1}(x, y, z) = \quad \text{(B-9)}$$

$$\int_{r=0}^{L_2} \int_{\theta=0}^{\pi} \int_{\varphi=-\pi}^{\pi} g(r) \tilde{n}_{-1}(x + r\sin\theta\cos\varphi, y + r\sin\theta\sin\varphi, z + r\cos\theta)$$

$$r^2 \sin\theta d\varphi d\theta dr.$$

For a 1D VTI model, the slowness function $n_{-1}(x, y, z)$ only varies in one direction, e.g., the z-direction. Thus, the slowness has the following property:

$$n_{-1}(x,y,z)=n_{-1}(x+\xi_1,y+\xi_2 z) \quad \text{(B-10)}$$

for any value of $\xi_1$ and $\xi_2$.

Inserting equation (B-10) into (B-9) and omitting the (x,y) coordinates, the smoothed slowness can be expressed as:

$$\tilde{n}_{-1}(z) = 2\pi \int_{r=0}^{L_2} g(r) r^2 \int_{\theta=0}^{\pi} n_{-1}(z + r\cos\theta) \sin\theta d\theta dr. \quad \text{(B-11)}$$

Inserting u=z+r cos θ in the inner integral in equation (B-11) gives:

$$\tilde{n}_{-1}(z) = 2\pi \int_{r=0}^{L_2} g(r) r \int_{u=z-r}^{z+r} n_{-1}(u) du dr. \quad \text{(B-12)}$$

The travel-time through the smoothed slowness between two arbitrary depth points $z_1$ and $z_2$ is obtained by integration of equation (B-12), $$\tilde{T}(z_1; z_2) = 2\pi \int_{r=0}^{L_2} g(r) r \int_{z=z_1}^{z_2} \int_{u=z-r}^{z+r} n_{-1}(u) du dz dr. \quad \text{(B-13)}$$

The next step is to define a step model, i.e., a 1D model with two constant slowness values and a single slowness discontinuity at z=0

$$n_{-1}(z) = \begin{cases} S_1, \text{ if } z < 0 \\ S_2, \text{ if } z \geq 0. \end{cases} \quad \text{(B-14)}$$

When the filter g(r) is convolved with $n_{-1}(z)$, the effect of the step (B-14) is only present in the range z=[−$L_2$, $L_2$] in the smoothed slowness $\tilde{n}_{-1}$. The travel-time preservation is therefore imposed in this range, i.e., it is desired to preserve travel-times for two depth intervals $z=[-L_2, L_2]$ and $z=[0, L_2]$.

In order to preserve travel-time from $z=-L_2$ to $z=L_2$, it can be proved that the volumetric integral of the filter has to equal unity. In the spherical coordinates, this is given by:

$$4\pi \int_{r=0}^{L_2} g(r) r^2 dr = 1. \tag{B-15}$$

By inserting the filter of equation (B-1) into equation (B-15), the following linear equation is obtained:

$$2\pi \sum_{i=0}^{3} a_{1i} \frac{2}{2i+3} L_1^{2i+3} + 2\pi \sum_{i=k}^{3+k} a_{2i} \frac{2}{2i+3} L_2^{2i+3} = 1. \tag{B-16}$$

The equation to ensure preservation of travel-time from $z=0$ to $z=L_2$ is found by setting the travel-time through the smooth model (B-12) equal to the corresponding travel-time in the unsmooth step model (B-14), resulting in:

$$\tilde{T}(0; L_2) = 2\pi \int_{r=0}^{L_2} g(r) r \int_{z=0}^{L_2} \int_{u=z-r}^{z+r} n_{-1}(u) du\, dz\, dr = S_2 \cdot L_2. \tag{B-17}$$

Then, the step model $n_{-1}$ in equation (B-14) and the filter coefficients in equation (B-1) are inserted into equation (B-17) to arrive at linear equation:

$$2\pi \sum_{i=0}^{3} a_{1i} \left( \frac{2}{2i+3} - \frac{L_1}{L_2} \frac{(1-R)}{2(2i+4)} \right) L_1^{2i+3} +$$
$$2\pi \sum_{i=k}^{3+k} a_{2i} \left( \frac{1-R}{(2i+3)(2i+4)} + \frac{1+R}{(2i+3)} + \frac{1-R}{2(2i+4)} \right) L_2^{2i+3} = 1, \tag{B-18}$$

where $R=S_1/S_2$ is the ratio between the slowness above and below the discontinuity in the step model.

Subtracting equation (B-18) from equation (B-16) it is obtained:

$$\sum_{i=0}^{3} a_{1i} \frac{L_1}{L_2} L_1^{2i+3} + \sum_{i=k}^{3+k} a_{2i} L_2^{2i+3} = 0, \tag{B-19}$$

which is independent of R. This means that the filter preserves travel-time at the discontinuity in an arbitrary step model independent of $S_1$ and $S_2$. Experiments illustrated above confirm this and show that the filter is travel-time-preserving also in step models with constant slowness slope above and below the discontinuity.

To summarize, a set of eight linear equations have been derived having eight unknown coefficients that can be given in a matrix-vector form, $$Ax=B, \tag{B-20}$$

where the vector $x=[a_{10}, a_{11}, a_{13}, a_{13}, a_{2k}, a_{2k+1}, a_{2k+2}, a_{2k+3}]^T$ contains the unknown filter parameters, and the coefficients of the 8×8 matrix A and the 8×1 vector B are found from the linear equations (B-7), (B-16) and (B-19) above, also repeated here:

$$\sum_{i=0}^{3} a_{1i} L_1^{2i} = 0, \tag{B-21}$$

$$\sum_{i=1}^{3} a_{1i} 2i L_1^{2i-1} = 0,$$

$$\sum_{i=1}^{3} a_{1i} 2i(2i-1) L_1^{2i-2} = 0,$$

$$\sum_{i=k}^{3+k} a_{2i} L_2^{2i} = 0,$$

$$\sum_{i=max(k,1)}^{3+k} a_{2i} 2i L_2^{2i-1} = 0,$$

$$\sum_{i=max(k,1)}^{3+k} a_{2i} 2i(2i-1) L_2^{2i-2} = 0,$$

$$2\pi \sum_{i=0}^{3} a_{1i} \frac{2}{2i+3} L_1^{2i+3} + 2\pi \sum_{i=k}^{3+k} a_{2i} \frac{2}{2i+3} L_2^{2i+3} = 1,$$

$$\sum_{i=0}^{3} a_{1i} \frac{L_1}{L_2} L_1^{2i+3} + \sum_{i=k}^{3+k} a_{2i} L_2^{2i+3} = 0.$$

It can be seen from these equations that $B=[0,0,0,0,0,0,1,0]^T$.

Computer Implementation

Figure 13:
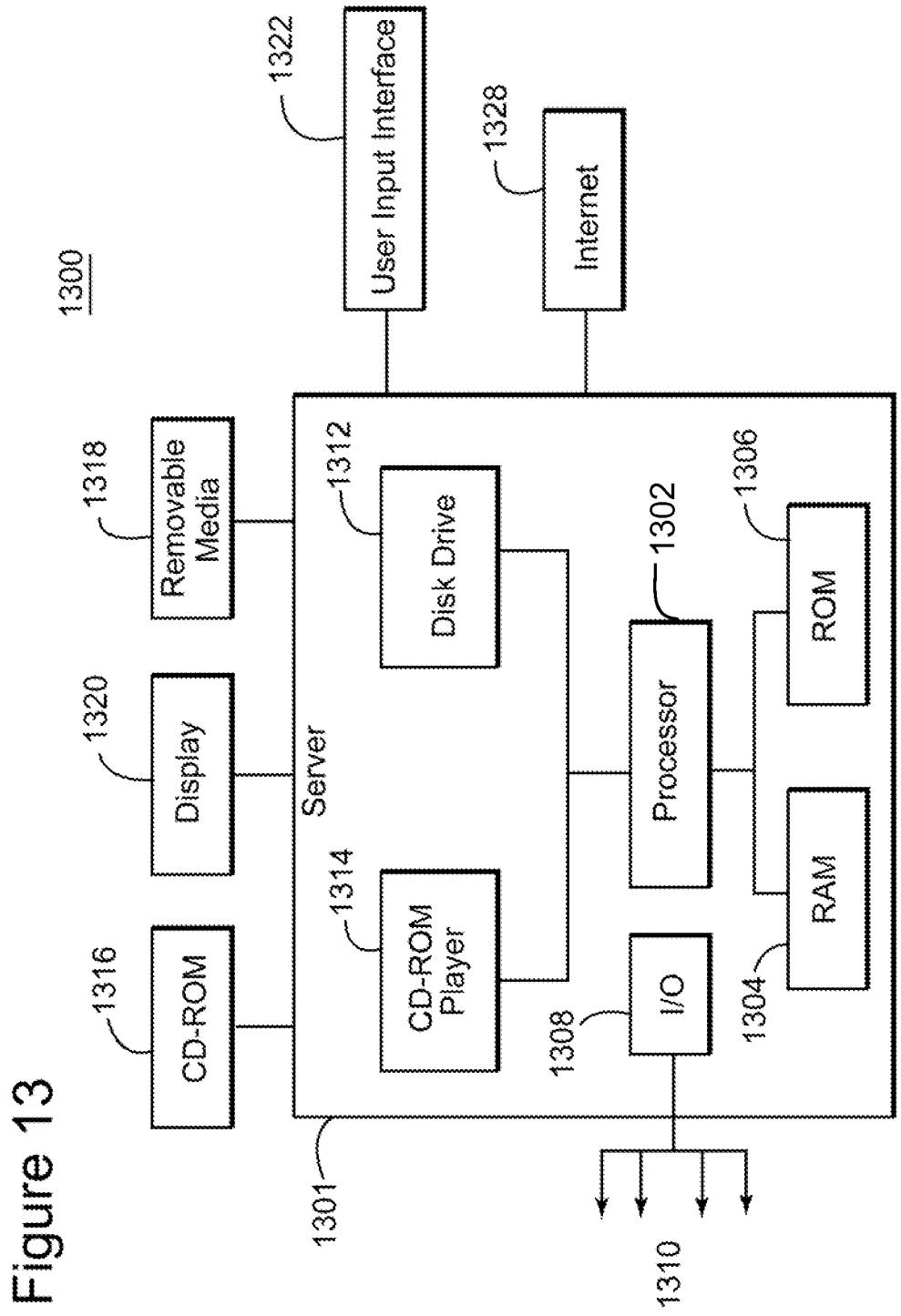
FIG. 13 is a schematic diagram of a computing device configured to smooth a velocity model according to an exemplary embodiment.

The methods discussed above may be implemented in dedicated devices (e.g., dedicated networks or computers or cloud-computing networks, etc.) for being performed. A combination of software and hardware may be used to achieve the event-related transversal isotropic axis and/or an associated tilt model. A dedicated machine that can implement one or more of the above-discussed exemplary embodiments is now discussed with reference to FIG. 13.

An exemplary computing arrangement 1300 suitable for performing the activities described in the exemplary embodiments may include server 1301. Such a server 1301 may include a central processor (CPU) 1302 coupled to a random access memory (RAM) 1304 and to a read-only memory (ROM) 1306. The ROM 1306 may also be other types of storage media to store programs, such as programmable ROM (PROM), erasable PROM (EPROM), etc. The processor 1302 may communicate with other internal and external components through input/output (I/O) circuitry 1308 and bussing 1310, to provide control signals and the like. The processor 1302 carries out a variety of functions as are known in the art, as dictated by software and/or firmware instructions.

The server 1301 may also include one or more data storage devices, including hard and floppy disk drives 1312, CD-ROM drives 1314, and other hardware capable of reading and/or storing information such as DVD, etc. In one embodiment, software for carrying out the above-discussed steps may be stored and distributed on a CD-ROM 1316, USB memory 1318 or other form of media capable of portably storing information. These storage media may be inserted into, and read by, devices such as the CD-ROM drive 1314, the disk drive 1312, etc. The server 1301 may be coupled to a display 1320, which may be any type of known display or presentation screen, such as LCD, plasma displays, cathode ray tubes (CRT), etc. A user input interface 1322 is provided, including one or more user interface mechanisms such as a mouse, keyboard, microphone, touchpad, touch screen, voice-recognition system, etc.

The server 1301 may be coupled to other computing devices, such as the landline and/or wireless terminals and associated watcher applications, via a network. The server may be part of a larger network configuration as in a global area network (GAN) such as the Internet 1328, which allows ultimate connection to the various landline and/or mobile client/watcher devices.

As also will be appreciated by one skilled in the art, the exemplary embodiments may be embodied in a wireless communication device, a computer network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized including hard disks, CD-ROMs, digital versatile disc (DVD), optical storage devices, or magnetic storage devices such a floppy disk or magnetic tape. Other non-limiting examples of computer readable-media include flash-type memories or other known memories.

The disclosed exemplary embodiments provide a system and a method for estimating an event-related main anisotropy axis and/or corresponding model. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for smoothing an original velocity model of a given subsurface such that a travel-time through the given subsurface is preserved, the method comprising:
receiving the original velocity model, wherein the original velocity model has a set of model parameters that determine a given parameterization and the original velocity model has velocity discontinuities at various depths;
selecting a non-zero sub-set of model parameters ($v$, $\delta$, $\epsilon$) from the set of model parameters of the given parameterization;
converting the selected sub-set of model parameters ($v$, $\delta$, $\epsilon$) to composite parameters ($n_{-1}$, $n_1$, $n_3$);
smoothing with a processor the composite parameters ($n_{-1}$, $n_1$, $n_3$) by applying a convolutional filter (g) such that velocity moments ($m_{-1}$, $m_1$, $m_3$) are preserved at the velocity discontinuities; and
generating a smooth velocity model by converting the smoothed composite parameters into a smoothed sub-set of model parameters.

2. The method of claim 1, further comprising:
smoothing the remaining model parameters with a filter that is different from the convolutional filter or identical to the convolutional filter.

3. The method of claim 1, wherein the set of model parameters includes five parameters and the sub-set of model parameters includes three parameters.

4. The method of claim 1, wherein the sub-set of model parameters includes a wave velocity along a symmetry axis, and two Thomsen parameters, and the remaining model parameters include two dip angles of a plane perpendicular to the symmetry axis.

5. The method of claim 4, further comprising:
smoothing the two dip angles using a Gaussian filter.

6. The method of claim 1, wherein the velocity moments ($m_{-1}$, $m_1$, $m_3$) are given by:

$$m_{-1} = \frac{1}{z}\int_0^z n_{-1}(\xi)d\xi,$$

$$m_1 = \frac{1}{z}\int_0^z n_1(\xi)d\xi, \text{ and}$$

$$m_3 = \frac{1}{z}\int_0^z n_3(\xi)d\xi,$$

where $n_{-1}$, $n_1$ and $n_3$ are the composite parameters and $\xi$ is a depth.

7. The method of claim 6, further comprising:
converting the smoothed composite parameters into an original parameter space to obtain the smoothed velocity model.

8. The method of claim 6, wherein the velocity moments are related to travel-time parameters ($t_0$, $v_{nmo}$, $S_2$) as follows:

$$t_0 = 2zm_{-1},$$

$$v_{nmo}^2 = \frac{m_1}{m_{-1}}, \text{ and}$$

$$S_2 = \frac{m_3 m_{-1}}{m_1^2},$$

where z is a depth of a reflector, $t_0$ is a two-way travel-time, $v_{nmo}$ is a normal move-out velocity, and $S_2$ is a heterogeneity coefficient.

9. The method of claim 1, further comprising:
selecting the convolutional filter (g) to have a spherical symmetry.

10. The method of claim 9, further comprising:
defining the convolutional filter (g) to be a combination of two polynomials, a first polynomial ($g_1$) which has a smoothing function and a second polynomial ($g_2$) which has a compensation function.

11. A computing device for smoothing an original velocity model of a given subsurface such that a travel-time through the given subsurface is preserved, the computing device comprising:
an interface configured to receive the original velocity model, wherein the original velocity model has a set of model parameters that determine a given parameterization and the original velocity model has velocity discontinuities at various depths; and a processor connected to the interface and configured to,
select a non-zero sub-set of model parameters (v, δ, ε) from the set of model parameters of the given parameterization;
convert the selected sub-set of model parameters (v, δ, ε) to composite parameters ($n_{-1}$, $n_1$, $n_3$);
smooth the composite parameters ($n_{-1}$, $n_1$, $n_3$) by applying a convolutional filter (g) such that velocity moments ($m_{-1}$, $m_1$, $m_3$) are preserved at the velocity discontinuities; and
generate a smooth velocity model by converting the smoothed composite parameters into a smoothed sub-set of model parameters.

12. The computing device of claim 11, wherein the processor is further configured to:
smooth the remaining model parameters with a filter that is different from the convolutional filter or identical to the convolutional filter.

13. The computing device of claim 11, wherein the set of model parameters includes five parameters and the sub-set of model parameters includes three parameters.

14. The computing device of claim 11, wherein the sub-set of model parameters includes a wave velocity along a symmetry axis, and two Thomsen parameters, and the remaining model parameters include two dip angles of a plane perpendicular to the symmetry axis.

15. The computing device of claim 14, wherein the processor is further configured to:
smooth the two dip angles using a Gaussian filter.

16. The computing device of claim 11, wherein the velocity moments ($m_{-1}$, $m_1$, $m_3$) are given by:

$$m_{-1} = \frac{1}{z}\int_0^z n_{-1}(\xi)d\xi,$$

$$m_1 = \frac{1}{z}\int_0^z n_1(\xi)d\xi, \text{ and}$$

$$m_3 = \frac{1}{z}\int_0^z n_3(\xi)d\xi,$$

where $n_{-1}$, $n_1$ and $n_3$ are the composite parameters and $\xi$ is a depth.

17. The computing device of claim 16, wherein the processor is further configured to:
convert the smoothed composite parameters into an original parameter space to obtain the smoothed velocity model.

18. The computing device of claim 16, wherein the velocity moments are related to travel-time parameters ($t_0$, $v_{nmo}$, $S_2$) as follows:

$$t_0 = 2zm_{-1},$$

$$v_{nmo}^2 = \frac{m_1}{m_{-1}}, \text{ and}$$

$$S_2 = \frac{m_3 m_{-1}}{m_1^2},$$

where z is a depth of a reflector, $t_0$ is a two-way travel-time, $v_{nmo}$ is a normal move-out velocity, and $S_2$ is a heterogeneity coefficient.

19. The computing device of claim 11, wherein the processor is further configured to:
select the convolutional filter (g) to have a spherical symmetry.

20. The computing device of claim 19, wherein the processor is further configured to:
select the convolutional filter (g) to be a combination of two polynomials, a first polynomial ($g_1$) which has a smoothing function and a second polynomial ($g_2$) which has a compensation function.

21. A non-transitory computer readable medium including computer executable instructions, wherein the instructions, when executed by a processor, implement a method for smoothing an original velocity model of a given subsurface such that a travel-time through the given subsurface is preserved, the instructions comprising:
receiving the original velocity model, wherein the original velocity model has a set of model parameters that determine a given parameterization and the original velocity model has velocity discontinuities at various depths;
selecting a non-zero sub-set of model parameters (v, δ, ε) from the set of model parameters of the given parameterization;
converting the selected sub-set of model parameters (v, δ, ε) to composite parameters ($n_{-1}$, $n_1$, $n_3$);
smoothing with a processor the composite parameters ($n_{-1}$, $n_1$, $n_3$) by applying a convolutional filter (g) such that velocity moments ($m_{-1}$, $m_1$, $m_3$) are preserved at the velocity discontinuities; and
generating a smooth velocity model by converting the smoothed composite parameters into a smoothed sub-set of model parameters.

\* \* \* \* \*